US012680912B2

(12) United States Patent
Koehl et al.

(10) Patent No.: US 12,680,912 B2
(45) Date of Patent: Jul. 14, 2026

(54) AUTONOMOUS REAL-TIME SULFUR DIOXIDE AND CARBON DIOXIDE MONITOR FOR MARINE EXHAUST EMISSIONS

(71) Applicant: SeaArctos Holdings LLC, New York, NY (US)

(72) Inventors: Andrew Koehl, Kowloon City (HK); Ashley Wilks, Stamford, CT (US); Robert James MacBlane, Farmington, NY (US); Michael W. Allen, Shortsville, NY (US); Shannon Mackey, Jacksonville, NY (US); John M. Kulukundis, Greenwich, CT (US)

(73) Assignee: SeaArctos Holdings LLC, New York, NY (US)

( * ) Notice: Subject to any disclaimer, the term of this patent is extended or adjusted under 35 U.S.C. 154(b) by 308 days.

(21) Appl. No.: 17/906,412

(22) PCT Filed: Mar. 16, 2021

(86) PCT No.: PCT/US2021/022565
§ 371 (c)(1),
(2) Date: Sep. 15, 2022

(87) PCT Pub. No.: WO2021/188538
PCT Pub. Date: Sep. 23, 2021

(65) Prior Publication Data
US 2023/0009342 A1      Jan. 12, 2023

Related U.S. Application Data

(60) Provisional application No. 63/110,159, filed on Nov. 5, 2020, provisional application No. 62/990,226, filed on Mar. 16, 2020.

(51) Int. Cl.
*G01M 15/10* (2006.01)
*F02C 6/20* (2006.01)
*G01N 1/22* (2006.01)

(52) U.S. Cl.
CPC ........... *G01M 15/102* (2013.01); *F02C 6/203* (2013.01); *G01N 1/2252* (2013.01); *G01N 2291/0217* (2013.01)

(58) Field of Classification Search
CPC .... G01M 15/102; F02C 6/203; G01N 1/2252; G01N 2291/0217
See application file for complete search history.

(56) References Cited

U.S. PATENT DOCUMENTS 5,572,424 A    11/1996 Kellogg et al.
6,118,269 A    9/2000 Davis
(Continued)

FOREIGN PATENT DOCUMENTS

CN    105275558 A    1/2016
CN    106170685 A  * 11/2016 ............. G01N 21/51
(Continued)

OTHER PUBLICATIONS

International Search Report for PCT/US2021/022565 dated Jul. 27, 2021.
(Continued)

*Primary Examiner* — Jamel E Williams
(74) *Attorney, Agent, or Firm* — Kilpatrick Townsend & Stockton LLP

(57) ABSTRACT

A maritime sulfur dioxide emissions switch monitoring system has an emissions sampling apparatus that is self-powered and requires a low power for operation. The emissions sampling apparatus has sensitive and selective chemical sensing technology capable of quantification of sulfur dioxide and carbon dioxide. Relative humidity, tem- (Continued)

perature and pressure sensors, in addition to sulfur dioxide and carbon dioxide are used for monitoring the exhaust gas. Filters are used to eliminate solid and liquid aerosolized components in marine engine exhaust.

5 Claims, 17 Drawing Sheets

(56)                References Cited

U.S. PATENT DOCUMENTS

| 2010/0206042 A1* | 8/2010 | Johns | G01M 15/108 |
| | | | 73/23.31 |
| 2011/0130916 A1 | 6/2011 | Mayer | |
| 2011/0257819 A1 | 10/2011 | Chen et al. | |
| 2016/0258371 A1* | 9/2016 | Makled | F02D 41/1402 |
| 2020/0309754 A1 | 10/2020 | Mackey | |

FOREIGN PATENT DOCUMENTS

| CN | 108801718 A | 11/2018 |
| CN | 208588715 U | 3/2019 |
| CN | 208636206 U | 3/2019 |
| EP | 2326139 A2 | 5/2011 |
| WO | 2015144175 A1 | 10/2015 |

OTHER PUBLICATIONS

Mihanovic Luka et al.: "Experimental investigation of exhaust emission from marine diesel engines", 2020 5th International Conference on Smart and Sustainable Technologies (SPLITECH), University of Split, FESB, Sep. 23, 2020 (Sep. 23, 2020), pp. 1-4, XP033850167, DOI: 10.23919/SPLITECH49282.2020.9243740; p. 1, right-hand column, paragraph 4-5.
Moldanova Jet al: "Characterisation of particulate matter and gaseous emissions from a large ship diesel engine", Atmospheric Environment, Elsevier, Amsterdam, NL, vol. 43, No. 16, May 1, 2009 (May 1, 2009), pp. 2632-2641, XP026044057.

* cited by examiner

10

4

4

161

131

AUTONOMOUS REAL-TIME SULFUR DIOXIDE AND CARBON DIOXIDE MONITOR FOR MARINE EXHAUST EMISSIONS

CROSS-REFERENCE TO RELATED APPLICATIONS

This application claims one or more inventions which were disclosed in Provisional Application No. 62/990,226, filed Mar. 16, 2020, entitled "MARITIME SULFUR DIOXIDE EMISSIONS SWITCH AND MONITORING SYSTEM" and Provisional Application No. 63/110,159, filed Nov. 5, 2020, entitled "AUTONOMOUS REAL-TIME SULFUR DIOXIDE AND CARBON DIOXIDE MONITOR FO MARINE EXHAUST EMISSIONS". The benefit under 35 USC § 119(e) of the United States provisional applications are hereby claimed, and the aforementioned applications are hereby incorporated herein by reference.

BACKGROUND

The invention pertains to the field of environmental sensors. More particularly, the invention pertains to sensors and methods of using sensors for autonomous real-time monitoring of sulfur dioxide and carbon dioxide in maritime exhaust emissions.

The maritime shipping industry is subject to the International Maritime Organization (IMO) regulations regarding Sulfur Dioxide ($SO_2$) exhaust emissions. The coast guards around the world, tasked with enforcing these regulations, have few options to detect non-compliance. Those that exist are expensive and provide only very limited coverage. The US Coast Guard (USCG) and British Marine and Coastguard Agency (MCA) Coast Guards, among others, have stated publicly that they have no effective means to monitor compliance, and desire a system to help them identify which ships need scrutiny. The regulations are scheduled to become more stringent on Jan. 1, 2020.

$SO_x$ exhaust emissions, barring any mitigation process such as exhaust gas cleaning systems, correlate directly to the sulfur content in the fuel. Effectively, the fuel sulfur concentration becomes a proxy for the exhaust sulfur concentration, and the fuel switching regulations reflect this understanding.

The regulations require ships without exhaust gas cleaning systems to switch to a compliant fuel for the zone they are in, and that a record be kept of the compliant behavior. The laws require that ships burn different concentrations of low sulfur fuel inside and outside of $SO_2$ Emissions Control Area (SECA) zones, and that a log of the fuel switch events are kept for review during inspections. Confirming that a fuel switch actually did happen when the log stated that it did is a lengthy and imprecise process, upon which fines and incarceration are weighed against.

Various attempts at "sniffing" the air over ships to detect suspect ships, whether with drones, planes, or bridge mounted sensors has proven tenuous, of limited range, and often expensive.

Permanent ship-mounted sensors are globally effective. However, laboratory grade sensing devices accurate enough to match fuel testing are exceedingly expensive to install and maintain—an untenable situation for consideration as a mandatory application.

This situation leaves the Coast Guards of the world with no effective way to know where to focus their attention.

SUMMARY

According to one embodiment of the present invention, a maritime sulfur dioxide emissions switch monitoring system has an emissions sampling apparatus that is self-powered and requires a low power for operation. The emissions sampling apparatus has sensitive and selective chemical sensing technology capable of quantification of sulfur dioxide ($SO_2$) and carbon dioxide ($CO_2$) in a chemically complex sample matrix. A quantification algorithm including relative humidity, temperature and pressure sensors, in addition to $SO_2$ and $CO_2$ is used for monitoring the exhaust gas. Filters are used to eliminate solid and liquid aerosolized components in marine engine exhaust.

DETAILED DESCRIPTION

Figure 1:
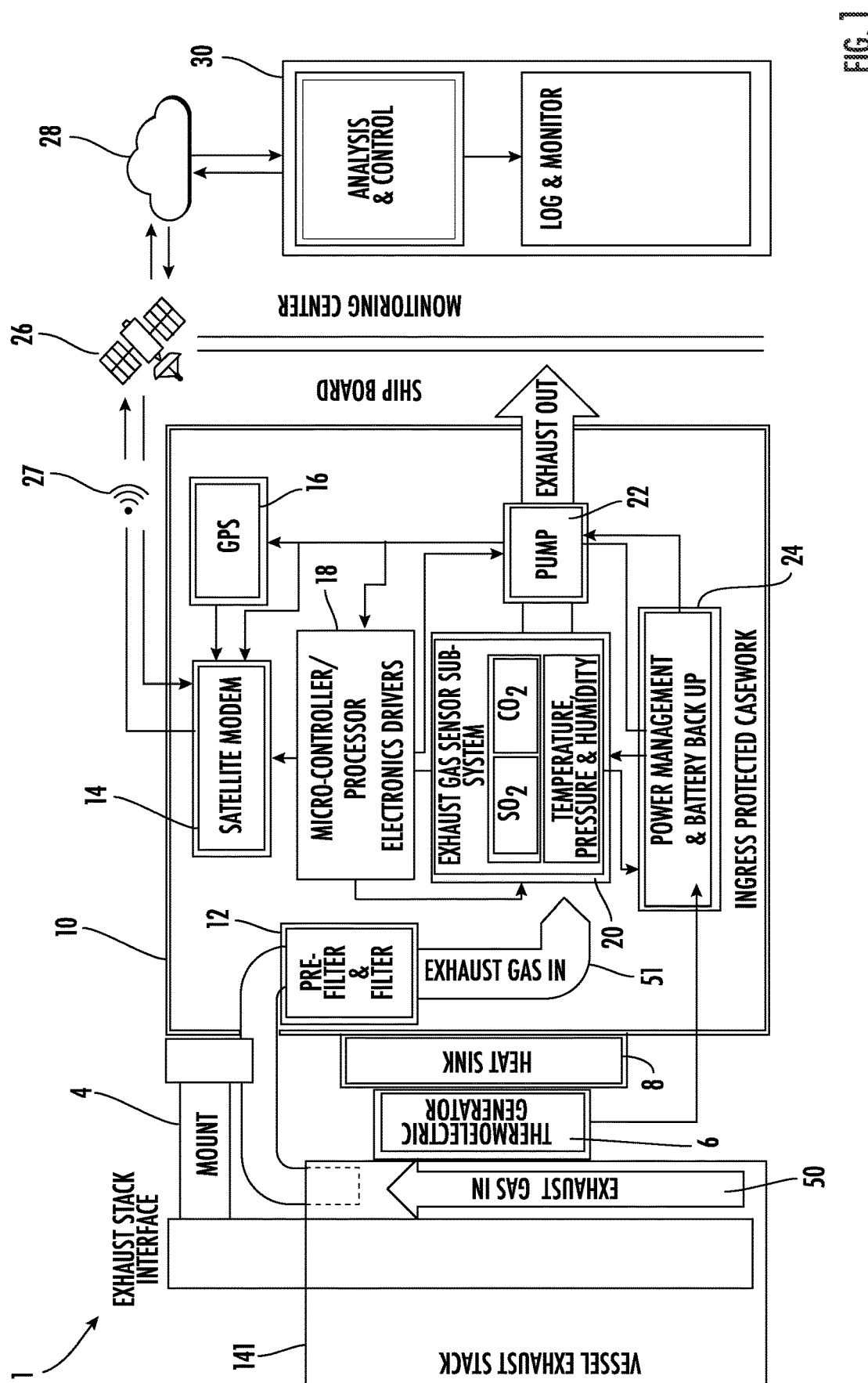
FIG. 1 shows an overview of the maritime sulfur dioxide emissions switch monitoring system.
Figures 2A, 2B:
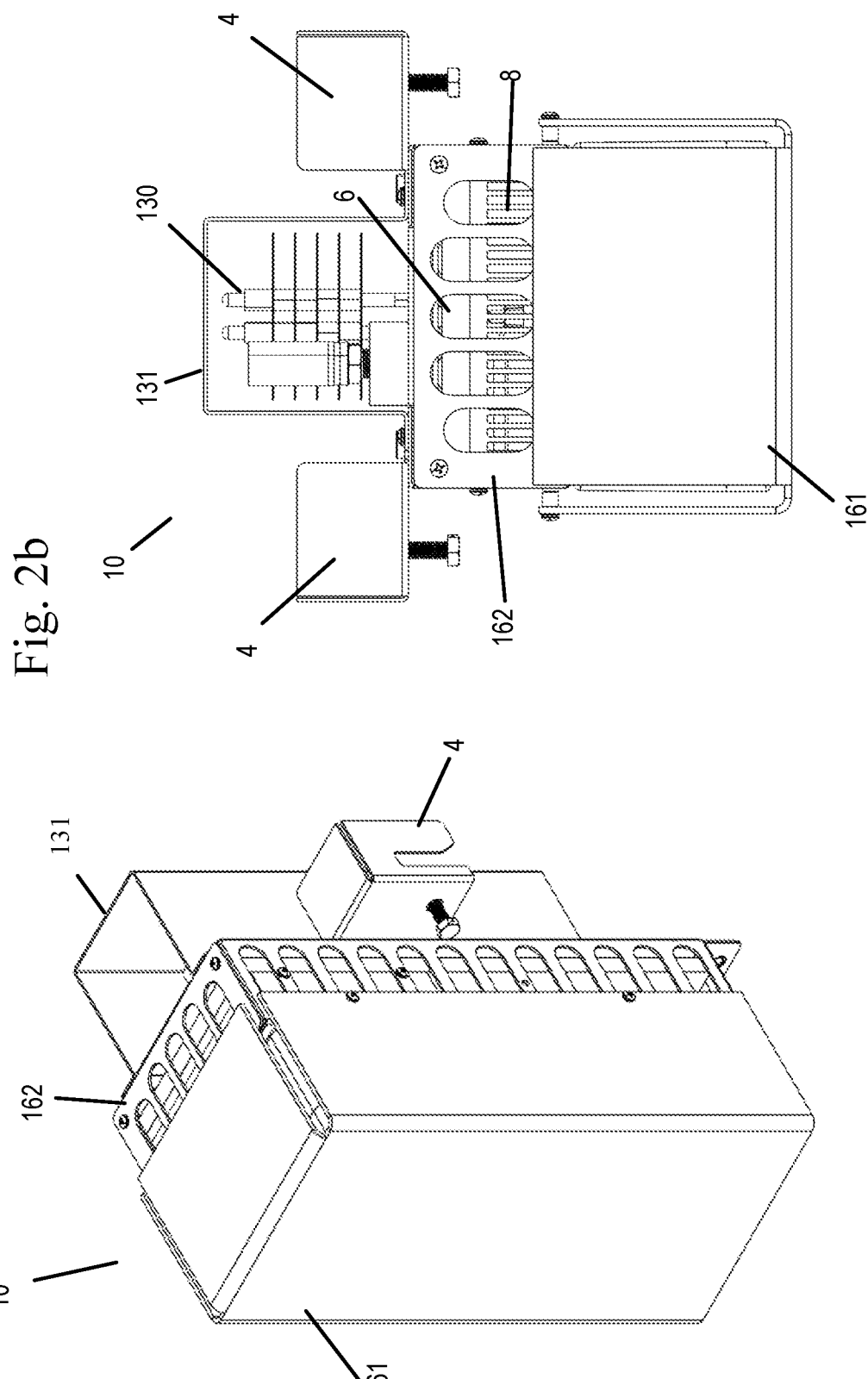
FIG. 2a shows an isometric view of the sulfur dioxide emissions apparatus.
FIG. 2b shows a top view of the sulfur dioxide emissions apparatus.
Figure 2D:
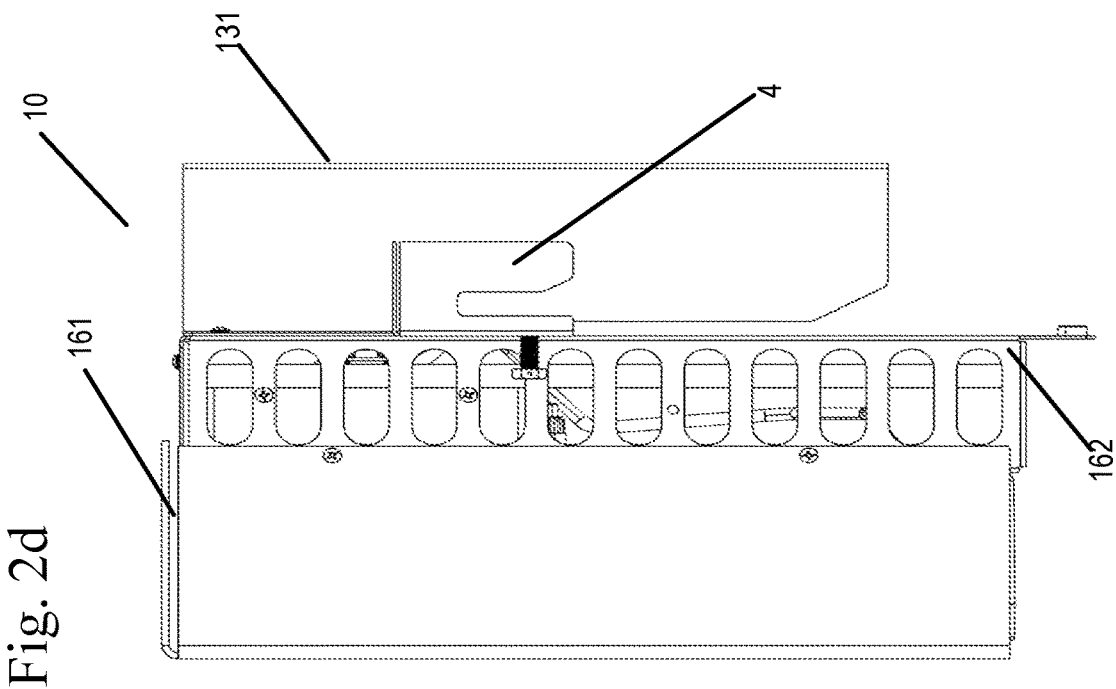
FIG. 2d shows a side view of the sulfur dioxide emissions apparatus.
Figure 2C:
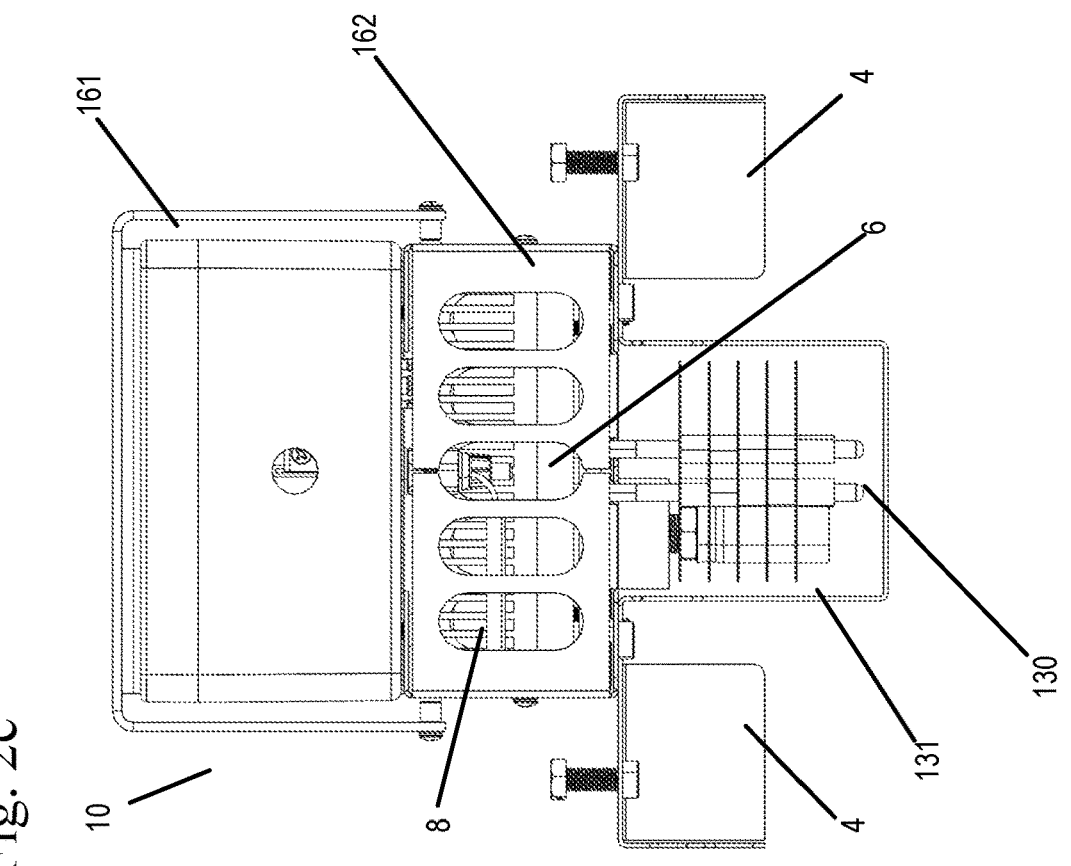
FIG. 2c shows a bottom view of the sulfur dioxide emissions apparatus.
Figure 2E:
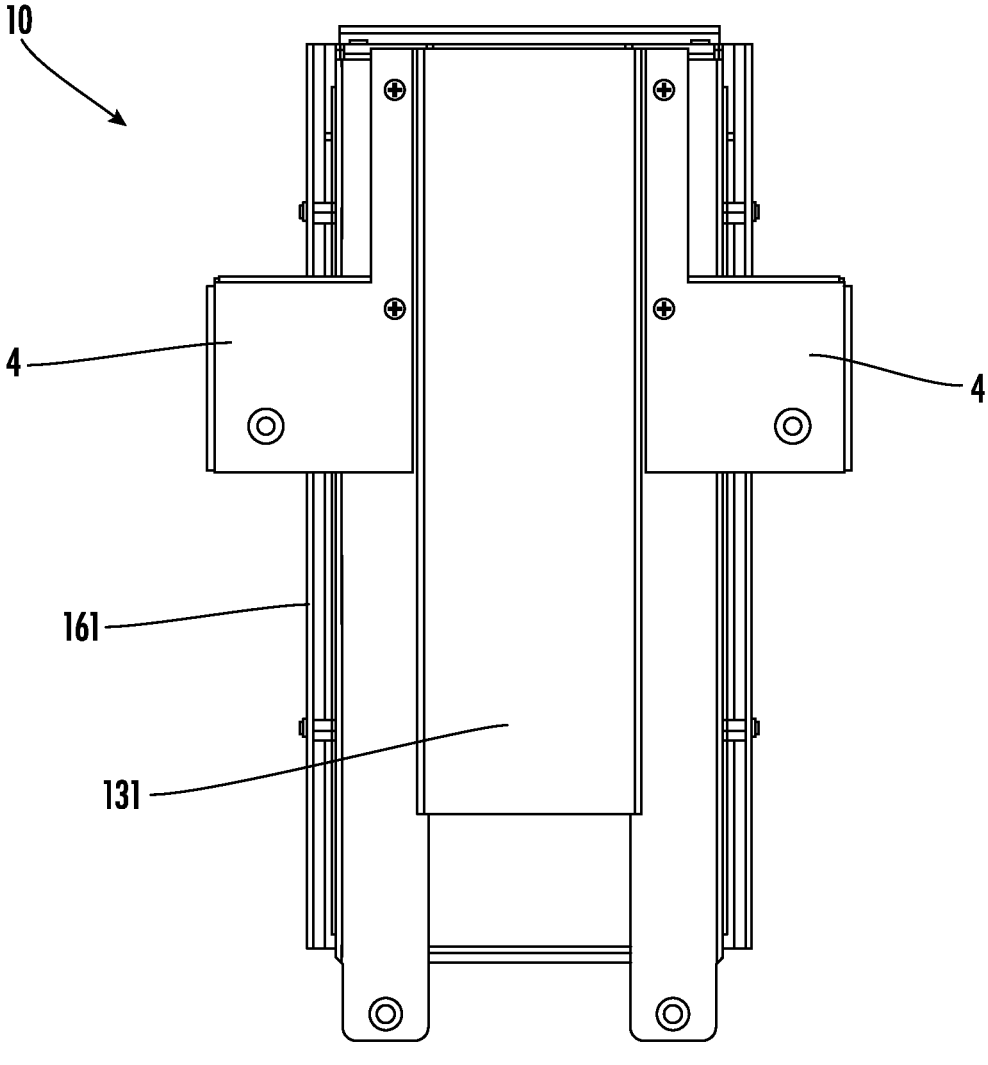
FIG. 2e shows a back view of the sulfur dioxide emissions apparatus.

The apparatus and methods described herein can determine that the fuel switching aspect, the most difficult regulatory compliance to confirm, is actually executed correctly with respect to an $SO_2$ Emission Control Area (SECA) boundary. The sensor system can then be used to corroborate the mandated log entries by providing immutable third party verification that fuel switches occurred appropriately at the SECA boundaries. It cannot assure that the ship burns compliant fuel—that is still on the operator to know what they are putting in their tanks—but it will indicate irregular readings in cases where sulfur concentration is changing unexpectedly, such as the case of an unclean fuel system. This information is valuable for a ship's operator in the appeals process of enforcement actions, and to greatly reduce inspection effort by those charged with enforcement.

The system can detect when a ship switched fuels, and on a compliant ship, that will confirm their log entries.

Low cost, low power $SO_2$ sensors do not have an adequately wide range to report the range of ppm values needed to do the calculations of $SO_2$ concentration in the exhaust to the accuracy required for the fuel sulfur compliance tests. Current regulations allow for 3.5% (35,000 ppm) $SO_2$ emission concentration for mid-ocean outside of SECA boundaries. On Jan. 1, 2020, that level is reduced to 0.5% (5000 ppm). Inside the SECA boundaries, near shore and ports, the limit is now, and will remain 0.1% (1000 ppm).

The combustion process reduces $SO_2$ in the exhaust to approximately 20 ppm by volume when burning 0.1% sulfur fuel and approximately 100 ppm by volume when burning 0.5% sulfur fuel. One of the challenges addressed by embodiments of the present invention is detecting and/or quantifying $SO_2$ at these levels in a chemically complex exhaust matrix, so as to determine the approximate fuel sulfur content and establish International Marine Organization (IMO) compliance or non-compliance.

In an embodiment of the present invention, stack exhaust gas of a maritime vessel is sampled at preprogramed intervals and preconditioned in a prefilter to eliminate particulate matter (PM) and equilibrate Water Vapor Content (WVC) to the local ambient environment. Sampling is driven by a pump, which pulls exhaust gases through an exhaust gas sensor subsystem of an emissions sampling apparatus. The exhaust gas sensor subsystem measures $CO_2$ and $SO_2$ of exhaust gases by means of a Non-Dispersive InfraRed Absorption Spectrometry (NDIR-AS) tuned to respond at respective band centers of $CO_2$ and $SO_2$ in the mid-IR spectral band. Non-target gas specific reference bands are used for internal reference and for WVC background correction in the $SO_2$ detection band. The emissions sampling apparatus is self-powered by a Thermo-electric Generator (TEG), which is driven by the temperature differential between the exhaust stack gas and an ingress protected exhaust gas sensor subsystem. The TEG also serves to maintain charge of a back-up battery that powers the emissions sampling apparatus when the TEG cannot deliver, for example due to low or absent engine load when the vessel is in port. The emissions sampling apparatus is further able to automatically switch to a sleep when engine is long-term idle, awaking once again when in service. The emissions sampling apparatus additionally includes a global positioning system (GPS) and can transmits $CO_2$ and $SO_2$ measurement data and other data at pseudo-real-time intervals over a communications link.

The emissions sampling apparatus has a small footprint, is self-powered and maintenance free.

The emissions sampling apparatus preferably can determine exhaust $SO_2$ content within a range of 2-500 parts per million volume (equivalent to fuel sulfur content (FSC) of <0.1%-3.5%). This range covers the use of ultra-low sulfur fuel oil (ULSFO), very-low sulfur fuel oil (VLSFO) and through heavy fuel oil (HFO) burning under all engine load conditions. The exhaust $CO_2$ content detection range is preferably between 2 to 5% by volume.

In on embodiment, the sampling takes place an intervals of approximately 60 minutes or less or at another interval when the maritime vessel is less than 20 nautical miles from a monitoring SECA boundary. Other sampling schemes may also be implemented.

Overview

FIG. 1 shows an overview of the maritime sulfur dioxide emissions switch monitoring system 1.

An emissions sampling apparatus 10 is attached to at least one exhaust stack of a funnel on a maritime vessel through a mount 4.

Referring to FIGS. 2a-2e, the emissions sampling apparatus 10 has a housing 161 which surrounds and protects subsystems of the apparatus 10 from dirt, airborne dust particles (IP66 or NEMA 4× rated). The housing 161 is connected to a heat sink housing 162 surrounding a heat sink 8 and a thermo-electric generator (TEG) 6. The TEG 6 is connected to a heat collector 130 adjacent the mount 4 for connecting and placement of the emissions sampling apparatus 10 within the exhaust stack of the maritime vessel. The heat collector 130 may be surrounded by a heat collector housing 131. When installed on an exhaust stack, the heat collector 130 is present within an exhaust gas stream from the exhaust stack. Also present within the housing 161 is a prefilter 12, a pump 22, an exhaust gas sensor subsystem 20, electronics drivers and processors 12, a satellite modem 14, a global positioning system 16, and a power management and battery back-up system 24.

Referring back to FIG. 1, exhaust gas 50 from the exhaust stack is pumped by pump 22 through an inlet of the prefilter 12 of the emissions sampling apparatus 10. The prefilter 12 also includes a condenser element discussed in further detail below. After the exhaust gas 51 has passes through the prefilter 12, the gas enters the exhaust gas sensor subsystem 20 which measures at least sulfur dioxide content, carbon dioxide content, temperature of the exhaust gas, pressure of the exhaust gas, and relative humidity. The exhaust gas 52 is then pumped and exhausted out of the emissions sampling apparatus 10 via pump 22 an exhaust outlet of a gas absorption cell of the exhaust gas sensor subsystem 20.

The emissions sampling apparatus 10 additionally has electronic drivers and processors 18 to control, process and store data from the exhaust gas sensor subsystem 20, the pump 22, and the satellite modem 14. The pump 22, the electronic drivers and processors 12, and the exhaust gas sensor subsystem 20 are additionally connected to a power management and battery back-up system 24 in communication with the TEG 6 for power supply.

Location from a global position system (GPS) 16 is also provided to the satellite modem 14 to send with other data to the monitoring center 30 over a network 28. The network 28 may comprise copper wires, optical fibers, wireless transmission, routers, firewalls, switches, gateway computers and/or edge servers.

The emissions sampling apparatus 10 on the maritime vessel is in communication via a network 28 through satellite 26 and/or wireless communication 27 with the monitoring center 30.

Thermo-Electric Generator (TEG)

Figure 9:
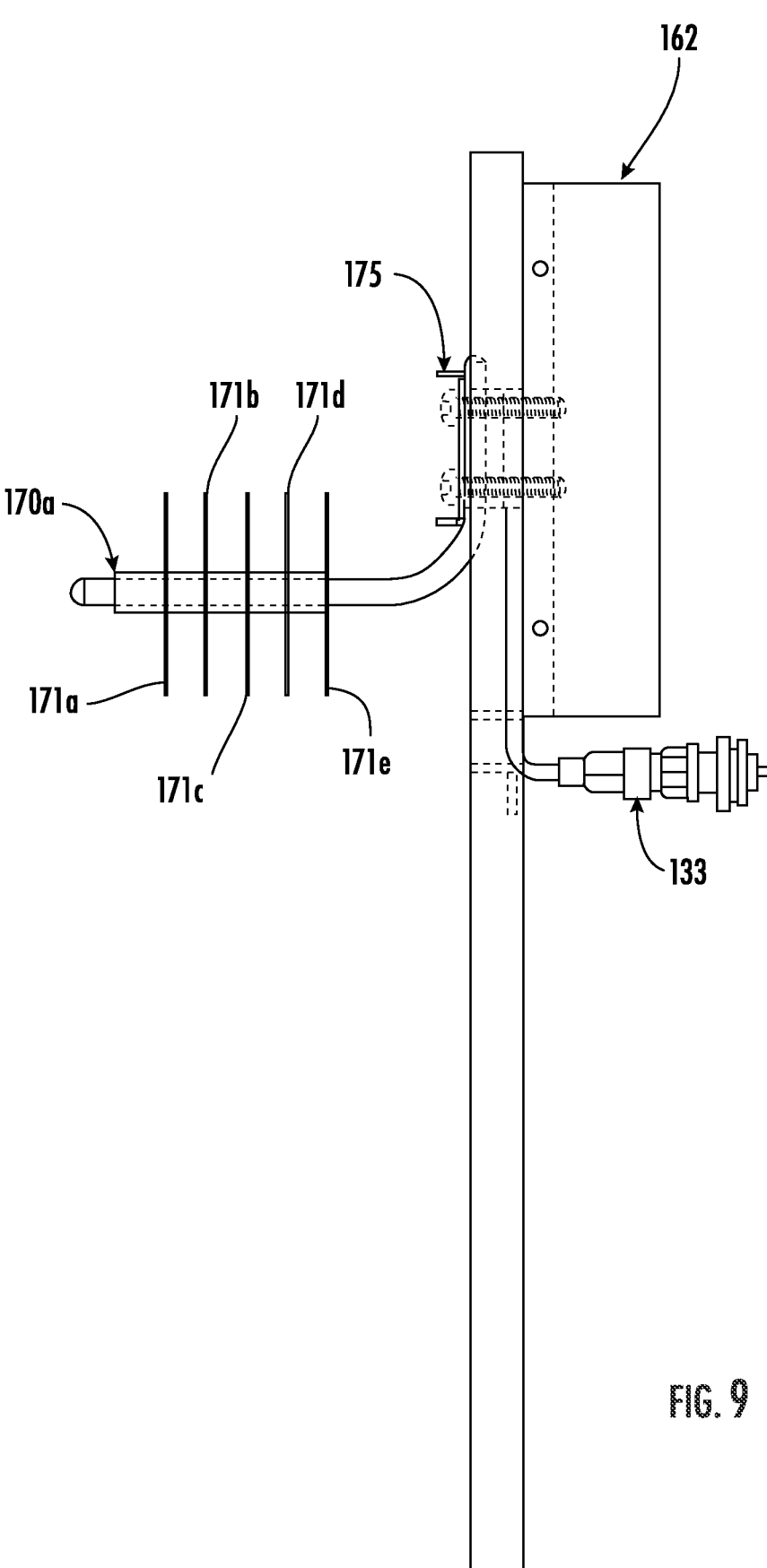
FIG. 9 shows a side view of the heat sink.
Figure 10:
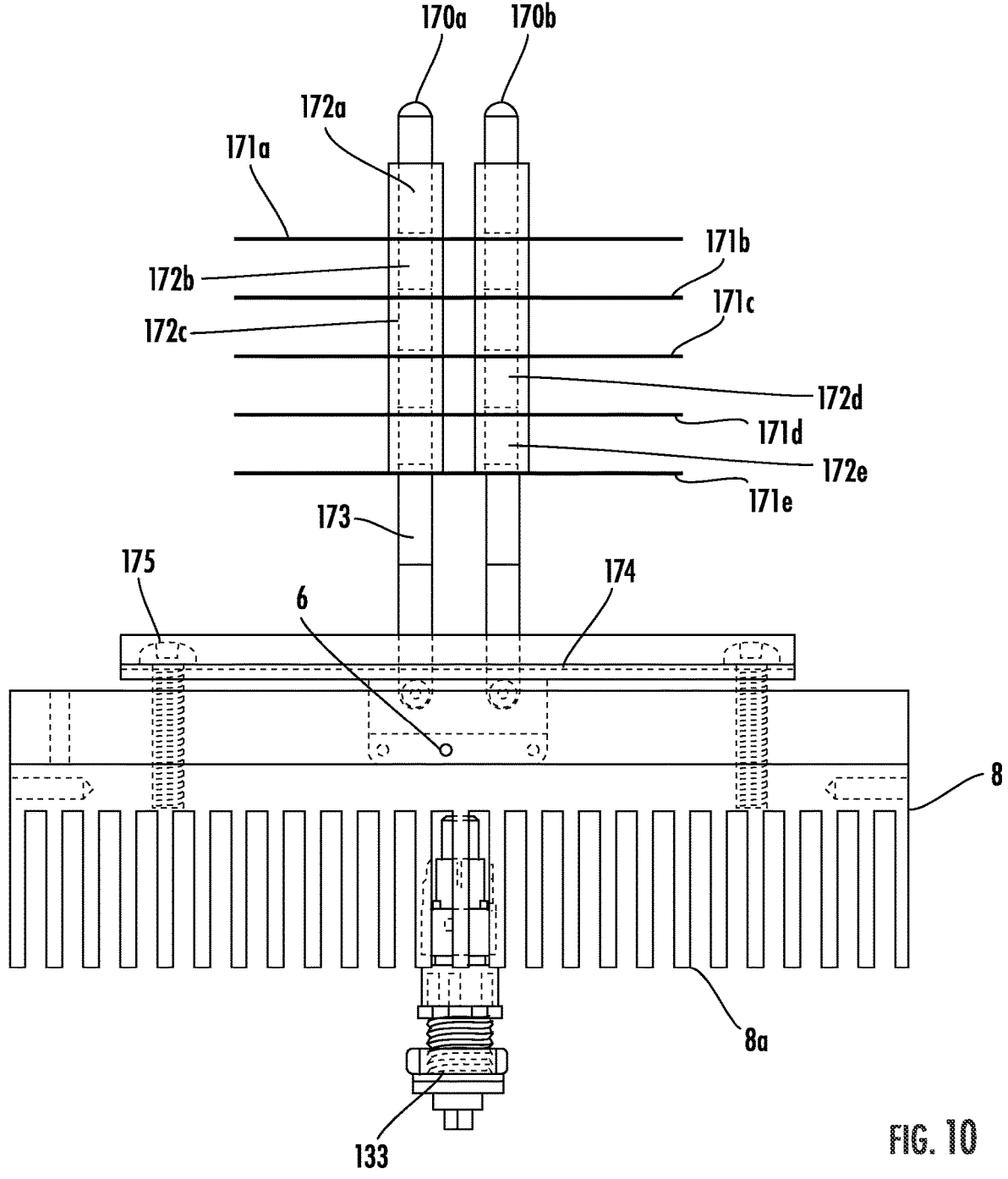
FIG. 10 shows a top view of the thermoelectric generator (TEG) and the heat sink.

Referring to FIGS. 9 and 10, within the heat sink housing 162 is a thermo-electric generator (TEG) 6, and a heat sink 8. The output of the TEG 6 and heat sink 8 is a power source connector 133 supplying power to the power management and back-up system 24 to power the emissions sampling apparatus 10.

The heat collector 130 is fixed to the heat sink housing 162 and the TEG 6, for example using clamps and screws 175 to hold the heat collector 130 and TEG 6 together with minimal separation. Insulation may be present between the heat collector 130 and the heat sink housing 162. The heat collector 130 is placed within the exhaust gas of the exhaust stack. The heat collector 130 includes at least two heat pipes 170a, 170b with a plurality of fins 171a, 171b, 171c, 171d, 171e spaced apart by spacers 172a, 172b, 172c, 172d, 172e.

The internal combustion engine of the maritime vessel emits exhaust gas through the exhaust gas stacks when operating, and the exhaust gas is generally characterized as having an elevated temperature. Fins 171a, 171b, 171c, 171d, 171e of the heat collector 130 collect heat directly from the exhaust gas of the exhaust gas stack and transfers heat through the heat pipes 170a, 170b. From the heat pipes 170a, 170b, heat is transferred to a heat carriers 173 which transfer the heat through the heat shield 174 to the TEG 6 and the heat sink 8. The heat shield 174 is present between the heat carriers 173 and the TEG 6. The heat shield 174 blocks heat to improve the effectiveness of the heat sink 8. Heat provided to the heat sink 8 dissipates on a heat dissipation side 8a. The thermal carriers 173 includes two dissimilar conductors which are bounded by the exhaust gas stack at a high temperature and the heat sink 8 at a lower temperature to create electrical potential. The TEG 6 generates power while cooling and dissipation of heat through the heat dissipation side 8a of the heat sink 8 to create electrical potential which can be stored and transferred to the power management and battery back-up system 24 and/or directly to power the emissions sampling apparatus 10 via the connector 133. The heat sink 8 draws heat from the TEG 6.

In other embodiments, the TEG 6 can be replaced with other self-powering options, which can include and is not limited to solar power or wind power.

The power management and battery backup system 24 controls the battery charging from the TEG 8 according to the voltage and environmental specifications of the battery of the emissions sampling apparatus 10. A state of charge calculation based on voltage and current flow monitoring over time and temperature is conducted by the power management and battery backup system 24. The state of charge value allows alerts to be triggered when the battery is in defective or low charge state.

Exhaust Gas Flow

Figure 3A:
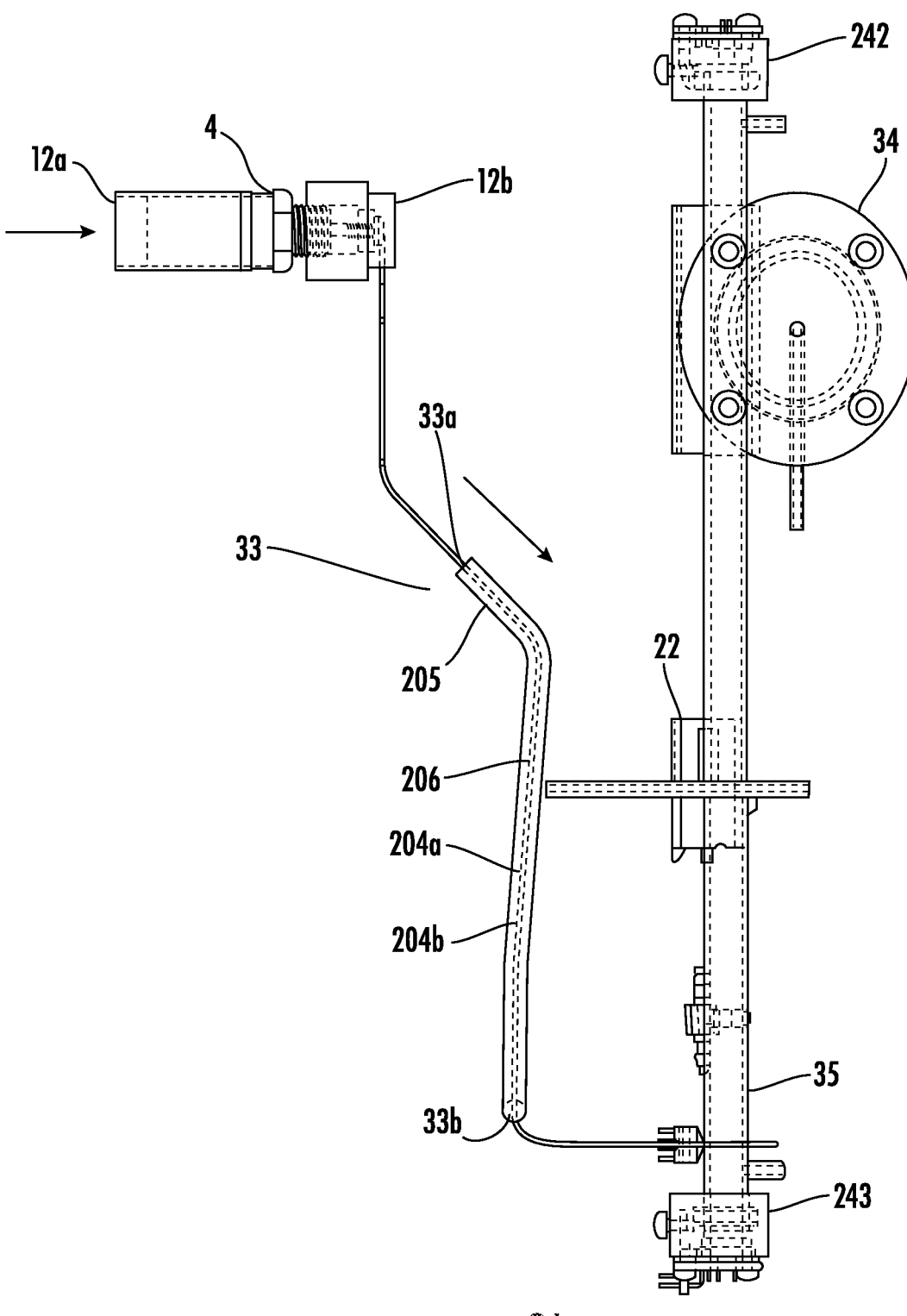
FIG. 3a shows a first view of the prefilter, exhaust gas filter sensor subsystem and pump of the sulfur dioxide emissions apparatus.
Figure 3B:
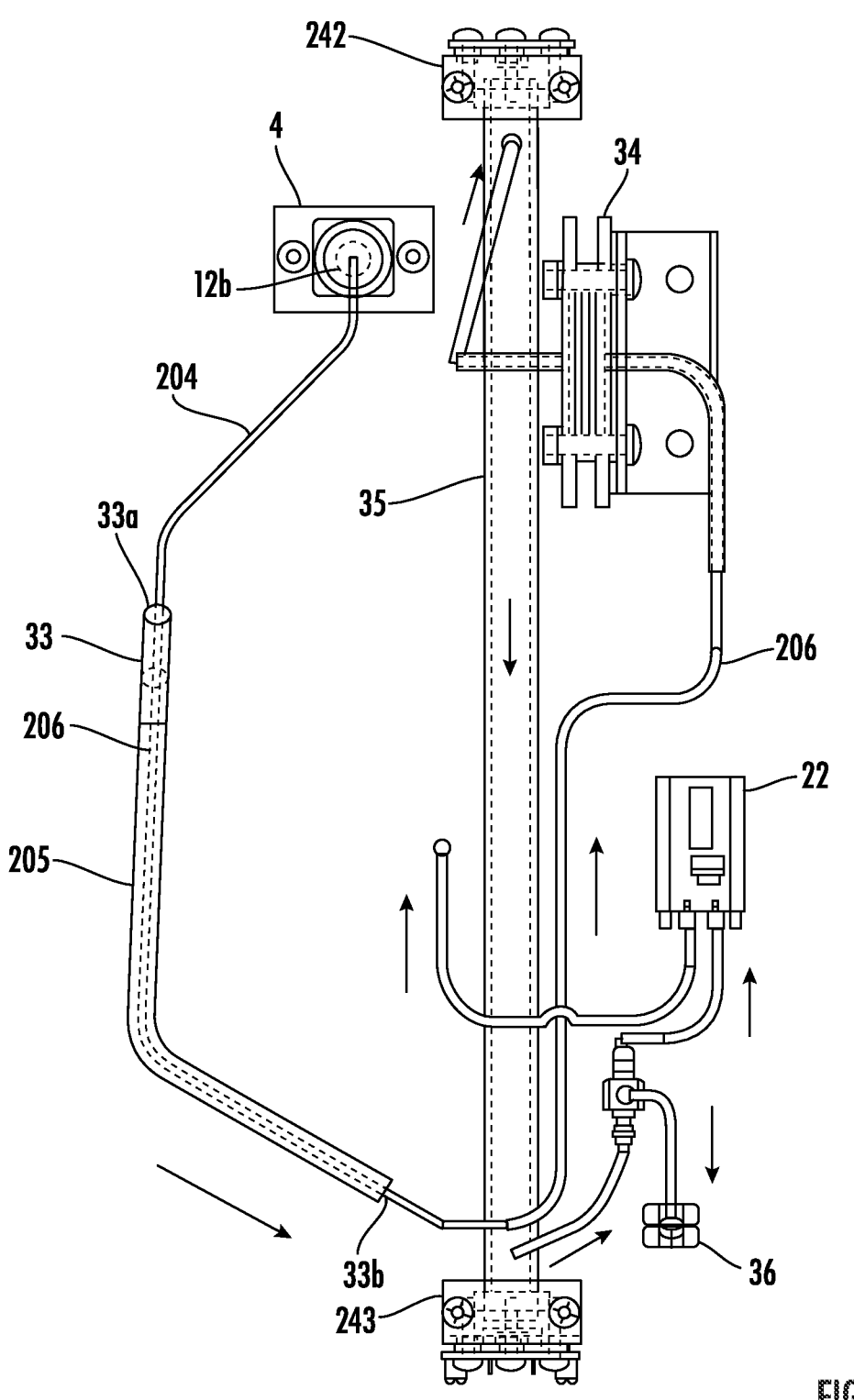
FIG. 3b shows an alternate view of the prefilter, exhaust gas filter sensor subsystem and pump of the sulfur dioxide emissions apparatus.

FIGS. 3a-3b show the prefilter, exhaust gas filter sensor subsystem and pump of the sulfur dioxide emissions apparatus. Exhaust gas flow is indicated by the arrows.

Generally, exhaust gas is pumped by pump 22 through the prefilter 4. From the prefilter 4, the exhaust gas travels through a condenser element 33, into layered filter 34. From layered filter 34, exhaust gas travels through a gas absorption cell 35 and exhausts out of the emissions sampling apparatus 10. A pressure/temperature sensor 36 is present between the gas absorption cell 35 and the pump 22.

Prefilter

Figure 4:
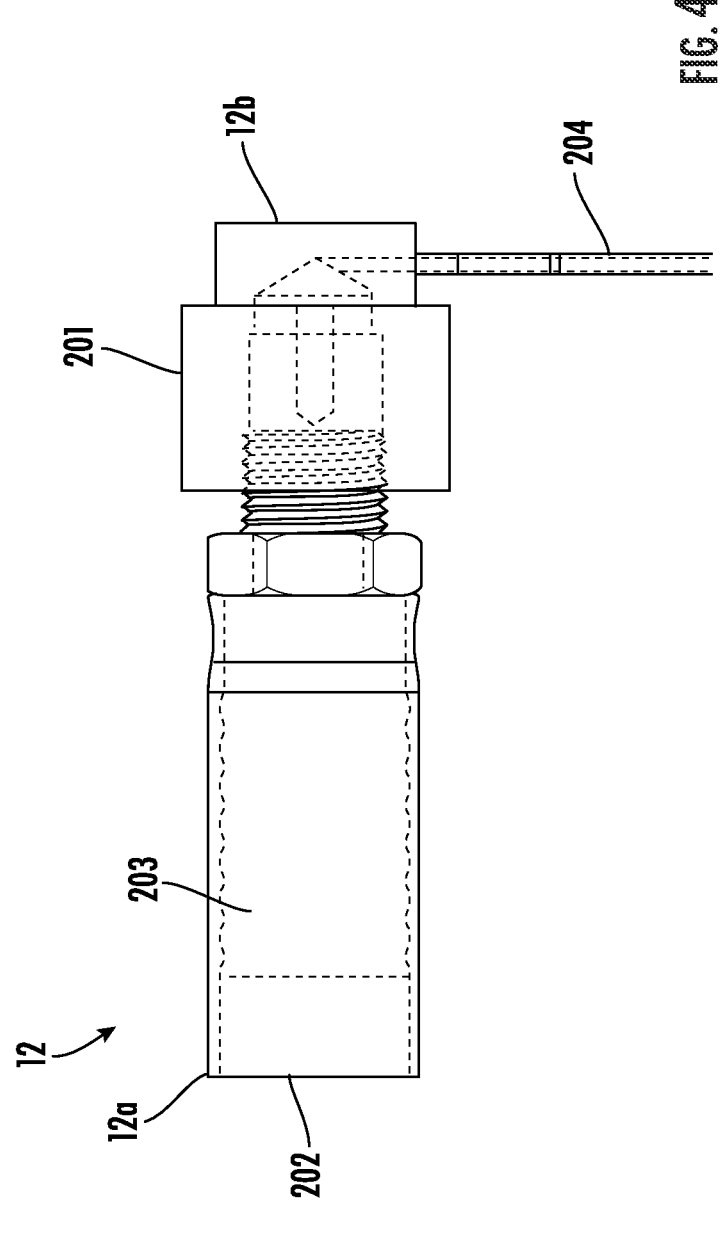
FIG. 4 shows a closeup of the prefilter of FIGS. 3a-3b.

FIG. 4 shows the prefilter 12. A first end 12a of the prefilter 12 has an exhaust gas intake 200 and is present within the exhaust gas stack. The second end 12b of the prefilter 12 is in communication with a condenser element 33 via a manifold 201, preferably made of stainless steel. The first end 12a has an opening 202 with a porous stainless steel filter 203 for receiving the exhaust gas intake. Exhaust gas passes through the filter 203, through the manifold 201 and into the tubing 204 connected to a first end 33a of a condenser element 33. The stainless steel filter 203 preferably removes particulates which are greater than 0.05 microns.

Condenser

Referring to FIGS. 3a-3b, the condenser 33 is formed of a sleeve 205 surrounding tubing 204. The tubing 204 is preferably porous allowing moisture to be transferred from the inside 204a of the tubing 204 to the outside 204b of the tubing 204. In on embodiment, the tubing 204 is made of a polymer and the sleeve 205 may be made of gore-tex or other breathable material. Ambient air through the sleeve 205 can be used to cool the exhaust gas vapor as the vapor travels through the tube 204. While not shown, water or other fluid may be circulated within the sleeve 205 to aid in cooling the exhaust gas vapor as the vapor travels through the tube 204. The exhaust gas vapor is preferably cooled below the dew point temperature of the ambient atmospheric conditions. The second end 33b of a condenser 33 is in communication with a layered filter 34.

Layered Filter

Figure 5A:
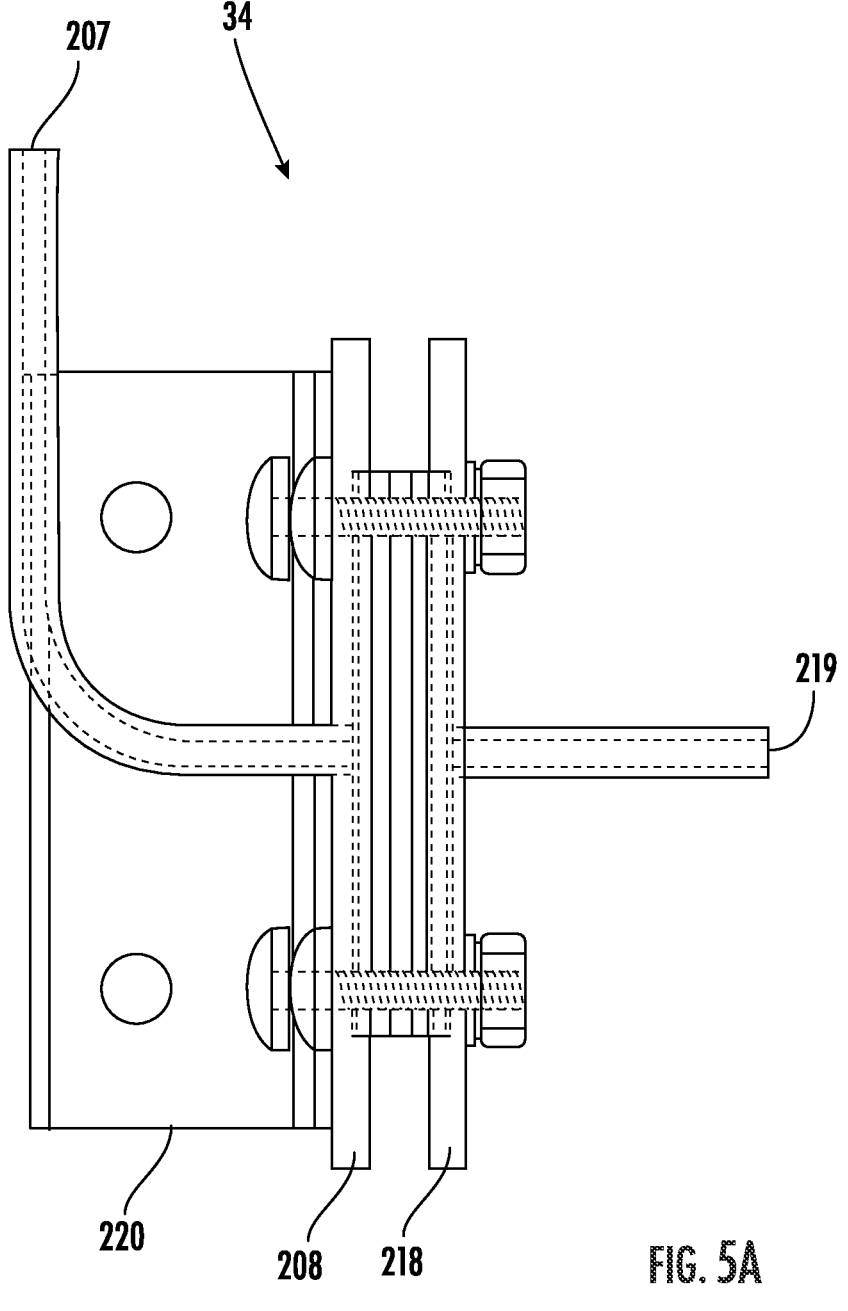
FIG. 5a shows a side view of the layered filter of FIGS. 3a-3b.
Figure 5B:
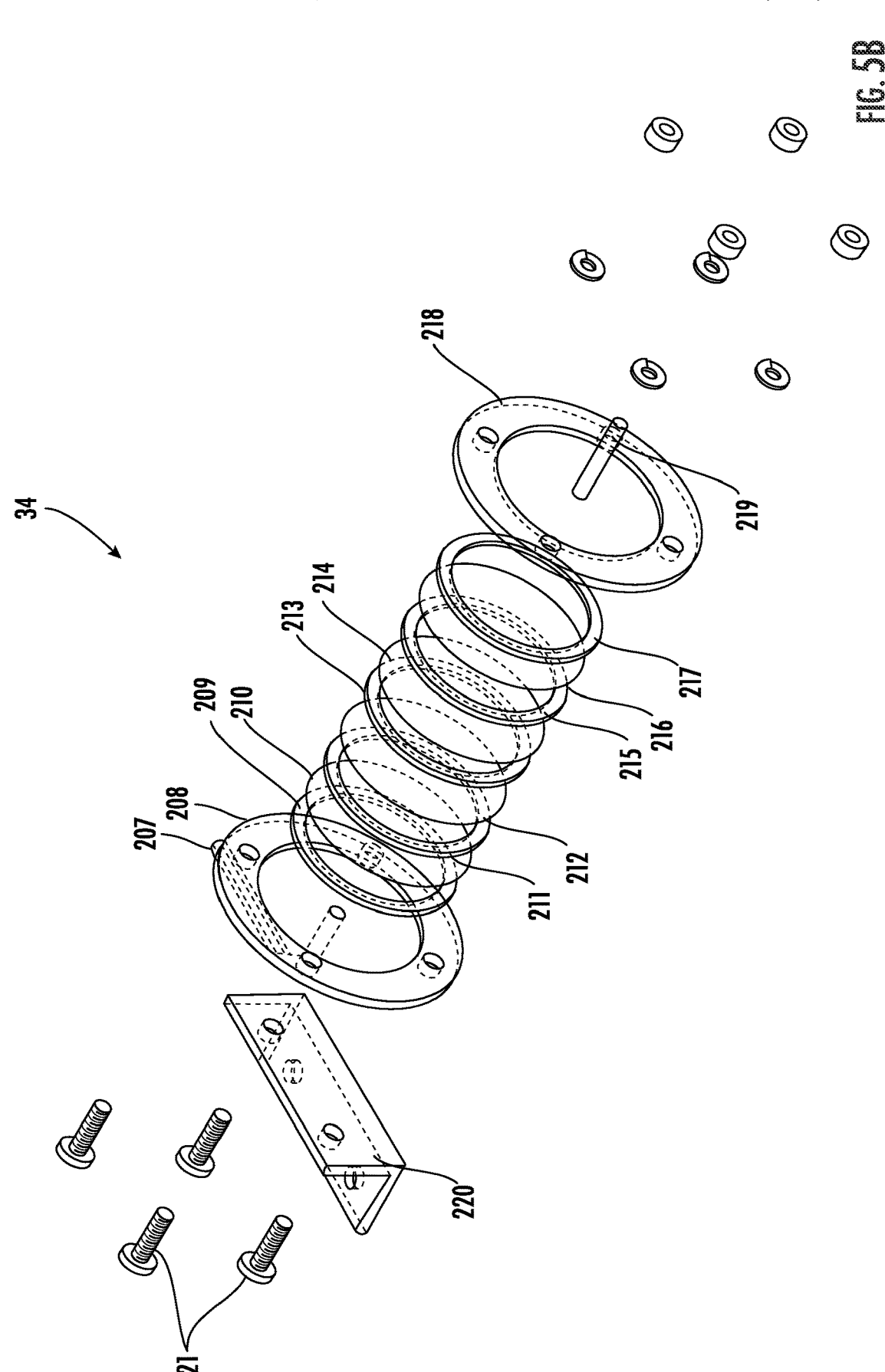
FIG. 5b shows an exploded isometric view of the layered filter of FIGS. 3a-3b.
Figure 5C:
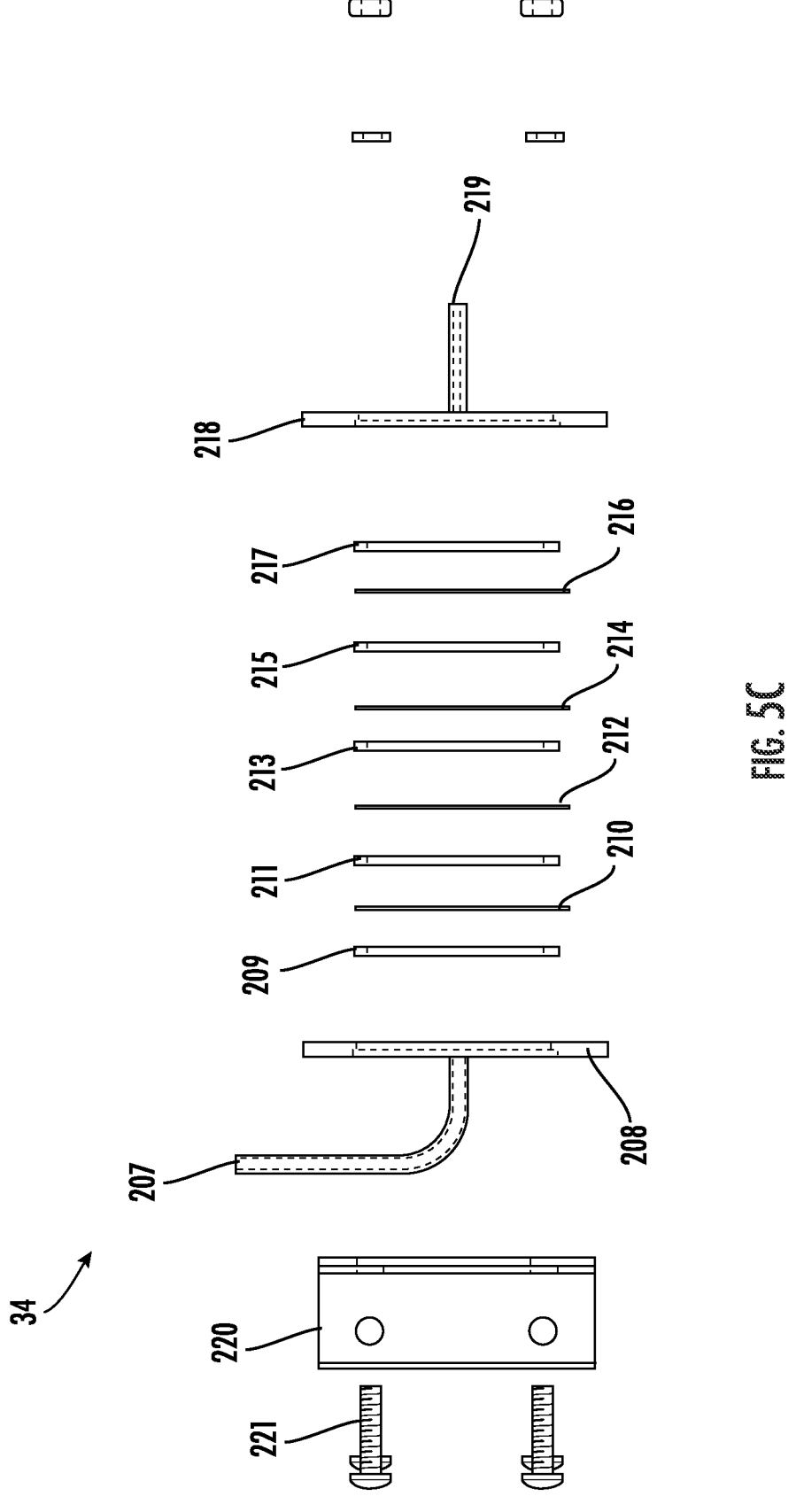
FIG. 5c shows an exploded side view of the layered filter of FIGS. 3a-3b.

The layered filter 34 receives the cooled air via a tube 206 through an intake 207 coupled to an intake flange 208 shown in FIGS. 5a-5c. From the intake flange 207, exhaust gas vapor passes through a first gasket 209, a first filter 210, a second gasket 211, a second filter 212, a third gasket 213, a third filter 214, a fourth gasket 215, a fourth filter 216 and a fifth gasket 217 to the exhaust through the exhaust 219 of the exhaust flange 218. The multiple gaskets 209, 211, 213, 215, 217 and filters 210, 212, 214, 216 are held in place between the exhaust flange 218 and the intake flange 208 via a plate 220 and bolts 221. The plate 220 additionally supports the pipe connection to pipe 206.

The first filter 210, second filter 212, third filter 214 and fourth filter 216 are all preferably different particle sizes. For example, the first filter 210 is a 10 μm filter, the second filter 212 is a 1.0 μm filter, the third filter 214 is a 0.45 μm filter and the fourth filter 216 is a wire mesh. The filter sizes can be any size that adequately eliminates the entry of particles that are greater than 2 μm to prevent infrared (IR) dispersion and eliminate as many particulates which are less than 2 μm to ensure that the gas absorption cell 240 discussed below does not suffer from precipitation of small particles within the sample chamber.

Gas Absorption Cell

Figure 6:
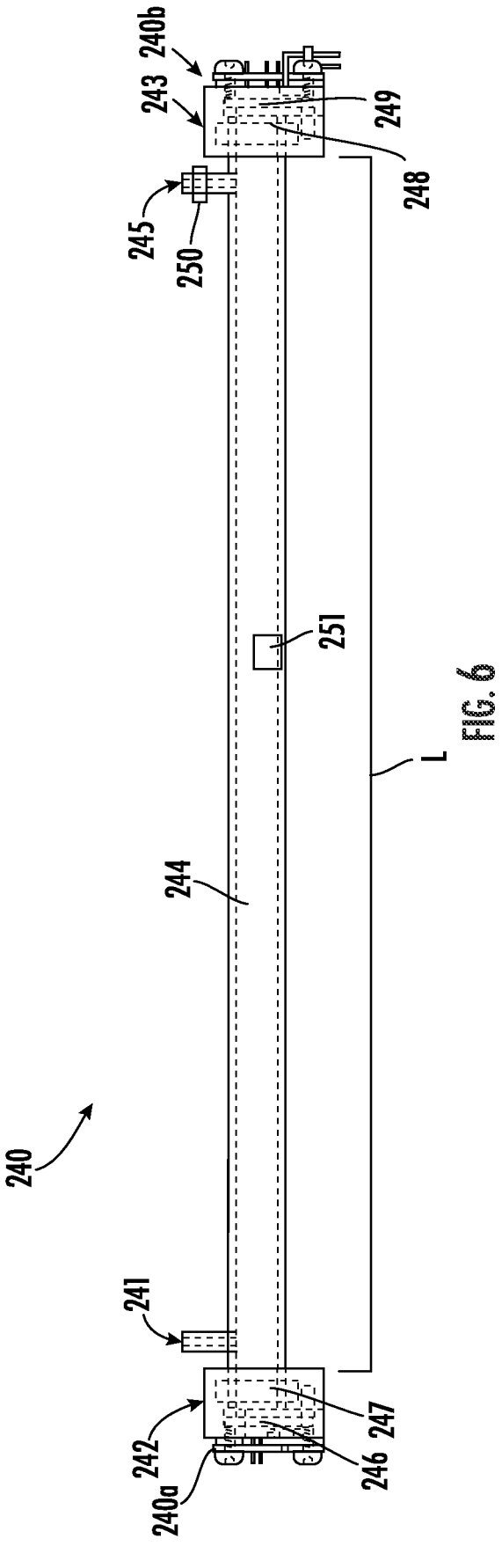
FIG. 6 shows a gas absorption cell of the exhaust gas filter sensor subsystem.

An example of the gas absorption cell 240 utilizing non-dispersive infrared absorption spectrometry (NDIR-AS) is shown in FIG. 6. From the exhaust 219 of the exhaust flange 218, exhaust gas vapor passes into the intake port 241 of the gas absorption cell 240.

The gas absorption cell 240 has a first end 240a with an emitter 242 and a second end 240b with a detector 243, and a length L between the emitter 242 and the detector 243 forming a sample chamber 244. The intake port 241 and the exhaust port 245 are between the emitter 242 and the detector 243 along the length L of the sample chamber 244 of the gas absorption cell 240. In one embodiment the sample chamber 244 has a length of at least 28.5 cm.

The emitter 240 at the first end 240a has a reflector 247 and an infrared source 246. The detector 243 at the second end 240b includes one or more passband filters 248 and an infrared detector 249. The infrared light from the infrared source 246 is directed through the sample chamber 244 towards the detector 243. Sensors 251 may be present within the sample chamber 244 for gas pressure and gas temperature. The location of the sensors 251 in FIG. 6 is for illustration purposes only and can be anywhere within the sample chamber 244. The gas in the sample chamber 244 causes absorption of specific wavelengths and the attenuation of these wavelengths is measured by the detector 243 to determine the gas concentration. One or more passband or optical filters 248 are located in front of the detector 243 to eliminate all infrared light except the wavelength that the selected gas molecules can absorb. The detector 243 measures the amount of infrared (IR) light that was not absorbed by the filters 248. After passing through the sample gas chamber 240, the exhaust gas vapor exits the gas absorption cell through the exhaust port 245.

In an embodiment of the present invention, the passband or optical filters 248 are specific to sulfur dioxide.

In another embodiment of the present invention, the passband or optical filters 248 are specific to carbon dioxide, sulfur dioxide and water.

In yet another embodiment, the passband or optical filters 248 include four filters corresponding to a carbon dioxide filter, a carbon dioxide reference filter, a sulfur dioxide filter and a sulfur dioxide reference filter.

In another embodiment a relative humidity sensor 250 is present at the exhaust port 245 to measure the water vapor content of the exhaust gas.

In an alternate embodiment, the gas absorption cell 240 has a single IR light source 246 and the detector 243 includes two detectors corresponding to two different passband filters 248 for different gases in front of the two detectors, for example carbon dioxide and sulfur dioxide. Infrared light that is absorbed by a target gas (e.g. sulfur dioxide or carbon dioxide) passes through the active filter with a particular bandwidth for the detection of the target gas. Infrared light that does not interact with the target gas passes through the reference filter. The difference between transmitted light intensities in these two bandwidths is converted into gas concentration. A dual wavelength sensor ensures stable measurements for a long period of operation as the aging effects of the light source or the gas cell are automatically compensated by output signals at the reference wavelength.

The filter 248 for carbon dioxide is preferably 4.45 µm with a reference of 4.65 µm. The filter 248 for sulfur dioxide is preferably 7.3 µm, with a reference of 7.85 µm. The detection of water vapor content to use a background correction is 7.85 µm with a reference of 4.65 µm.

In another embodiment, more than one filter for carbon dioxide can be present and more than one filter for sulfur dioxide can be present.

In one embodiment, the filter 248 for carbon dioxide is between 1.9-2.1 µm. In another embodiment, the filter 248 for carbon dioxide is between 2.6-2.9 µm. In yet another embodiment, the filter 248 is between 4.1-4.5 µm.

In one embodiment, the filter 248 for sulfur dioxide is between 7.1-7.6 µm.

In one embodiment, other filters can be present with various bands which are non-overlapping with carbon dioxide and sulfur dioxide or other exhaust gases, for example between 1.3-1.5 µm, 1.75-2.0 µm, 2.5-3.0 µm, and 5.0-8.0 µm.

In one embodiment, reference bands can also be present as a filter 248 which +/−0.2 µm or less than the filter. For example, a reference filter can 3.09 µm, 3.72 µm, 3.95 µm, and/or 7.85 µm.

In yet another embodiment, the single IR light source 246 comprises multiple sources with the filters 248 being adjacent the emitter and the IR light source 246.

The gas concentration is sent by the one or more detectors to the processors of the electronic drivers and processors 18. Exhaust gas 52 is then pumped out the exhaust outlet of the emissions sampling apparatus 10.

Electronics Drivers/Processors

The processors 18 receive data associated with the exhaust gas in the stack from the gas absorption cell 240 and various sensors and sends the data associated with the gas and other data to the monitoring center 30 with the satellite modem 14. The data is preferably sent in a byte array to reduce the amount of data being sent. It is noted that the data from the emissions sampling apparatus 10 is sent to the monitoring system 30 in a regular periodic fashion whether or not it is able to communicate or spare the energy to run the communication channel, for example via the satellite modem 14.

If the satellite 26 is not available or the emissions sampling apparatus 10 does not have enough available energy to send the data, time stamped exhaust sample data is collected and stored in memory, such as one or more computer-readable RAMs 822 and one or more computer-readable ROMs 824 or one or more computer-readable tangible storage devices 830 to be uploaded at another time. The data can additionally be manually extracted from the emissions sampling apparatus 10 if necessary.

It should also be noted that the power management system 24 of the emissions sampling apparatus 10 prioritizes data collection. The power management system 24 reduces energy expenditure by stopping data transmission during low battery state.

Figure 11:
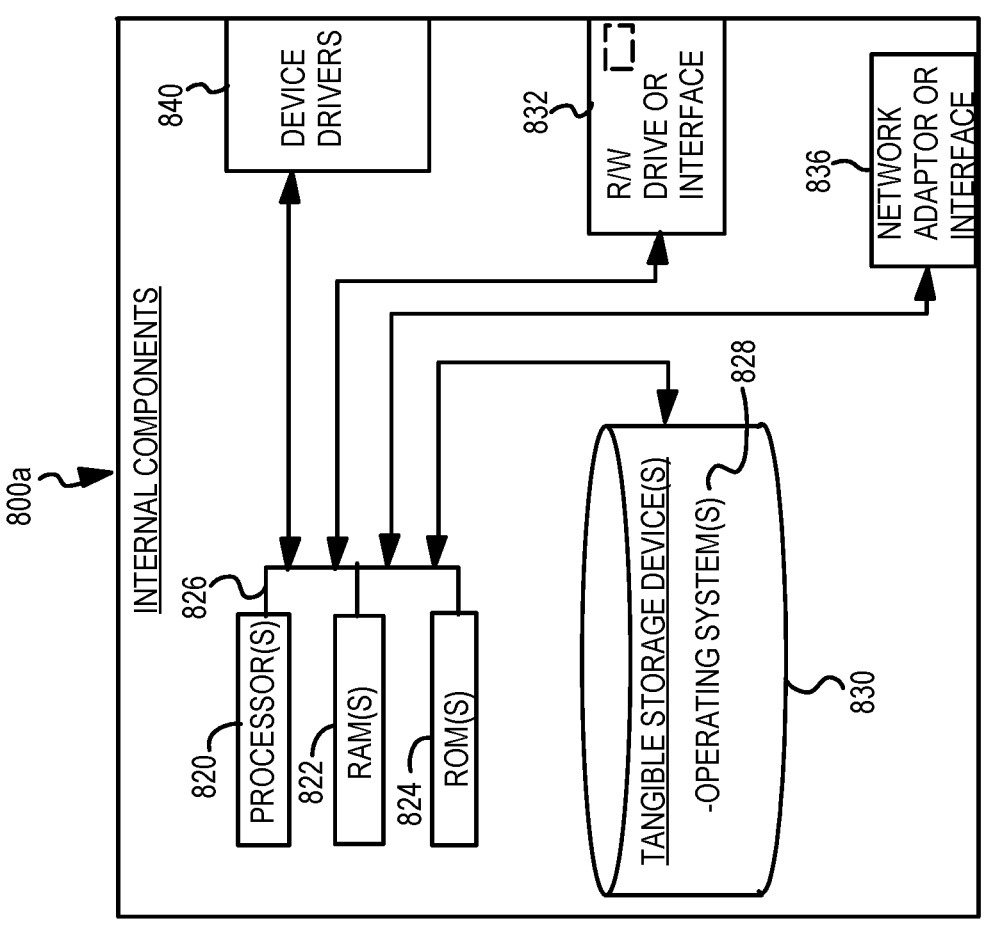
FIG. 11 illustrates internal components of the shipboard sulfur dioxide emissions apparatus and a computer associated with the monitoring center in which illustrative embodiments may be implemented.

An example of internal components associated with the electronic drivers and processors 18 are shown in FIG. 11. The electronic drivers and processors 18 can include one or more processors 820, one or more computer-readable RAMs 822 and one or more computer-readable ROMs 824 on one or more buses 826, and one or more operating systems 828 and one or more computer-readable tangible storage devices 830 as shown in FIG. 11. The one or more operating systems 828 are stored on one or more of the computer-readable tangible storage devices 830 for execution by one or more of the processors 820 via one or more of the RAMs 822 (which typically include cache memory). In the embodiment illustrated in FIG. 11, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The internal components 800a also includes a R/W drive or interface 832 to read from and write to one or more portable computer-readable tangible storage devices present as part of the monitoring system 30.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language, and procedural programming languages, or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Sampling Data Collection

In an embodiment, data is collected from the exhaust gas at least every 60 minutes. The rate of collection can increase when the maritime vessel is less than 20 nautical miles from a monitoring SECA boundary.

Figure 13:
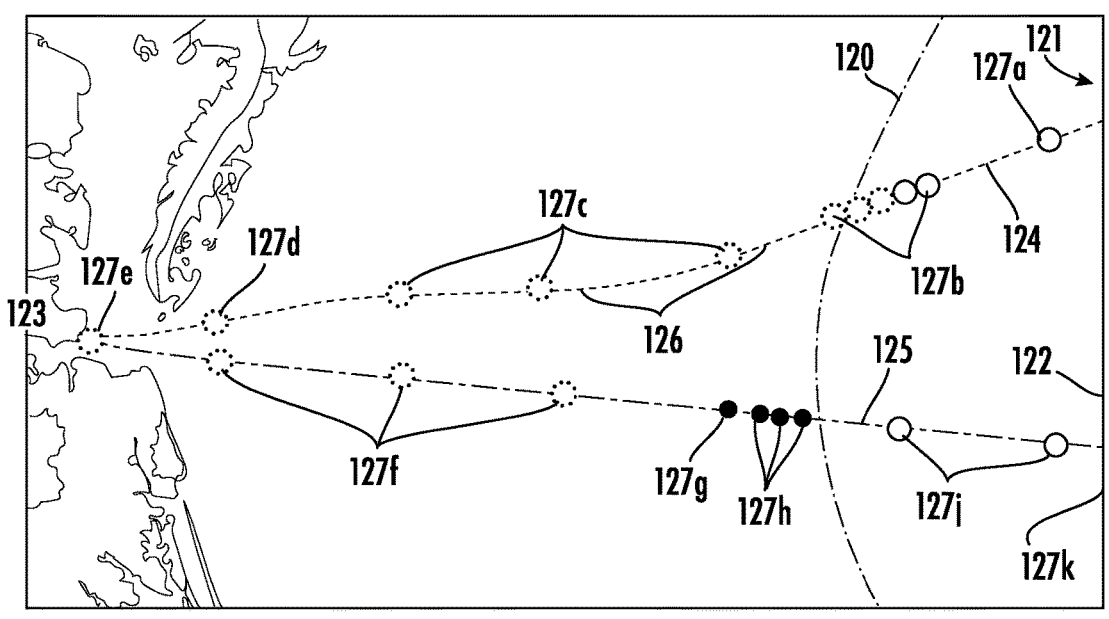
FIG. 13 shows a sketch of a sample strategy as a ship crosses a SECA boundary.

FIG. 13 shows a sketch of a sample strategy as a ship crosses a SECA boundary (dash-dot line 120) from out at sea 121 to port 123 and back to sea 122. The inbound path of the ship is represented by dashed line 124, and the outbound path of the ship is represented by short-long dash line 125. Each arrow 126 on each of the paths 124 and 125 represents approximately an hour's sailing.

The circles 127a-127j along the paths 124 and 125 represent the point at which the system takes action, which will be explained in detail in the following description. The black-filled circles 127g-127h represent readings which are out of range or "bad" (i.e. noncompliant), while the open (white-filled) circles 127a-127f and 127j indicate readings which are within range (i.e. compliant). Circles with dotted lines show low-emissions readings, circles with solid lines show high-emissions readings.

The exemplary strategy proceeds as follows, with the numbers referring to points on FIG. 11:

127a—At this point, the ship is outside the SECA boundary 120 on the inbound path 124, so high sulfur fuel is permitted. The readings from the emissions sampling apparatus 10 would be high, but still compliant, since at this point the more restricted range of the SECA does not yet apply. The system takes readings on a selected schedule, for example every hour as shown on FIG. 11. More frequent or less frequent schedules could also be chosen as appropriate. When a reading is taken, the data from the reading—for example, time, location, compliance status, and perhaps raw sensor data numbers—are stored in a repository on the ship for later transmission to the monitoring center 30 on shore.

127b—The ship is approaching the SECA boundary 120. The system starts taking more frequent readings, perhaps every ten minutes or more frequently, so as to capture the data showing a switch from high sulfur fuel to low sulfur fuel.

127c—The ship switched to low sulfur fuel as required, and the system confirms this with readings which show emissions to be compliant.

127d—At this point the ship is within range of the shore-based mobile telephone network. The system connects to the network and transmits a status report to the server at least indicating that the onboard system is operating OK and the ship is compliant. If desired, a full upload of data from the onboard repository could be transmitted to the central server at this time.

127e—The ship is in port 123. The system continues to monitor emissions to make sure it remains compliant. If it did not do so in step 127d, the data in the repository can be uploaded to the monitoring center 30 at this time while the ship is in port.

127f—The ship has left port by outbound path 125. The readings show that the emissions remain compliant with the inside-SECA standards.

127g—The system has detected a sample with a "bad" or out-of-range reading. It is possible that the ship has changed over to high sulfur fuel too soon, outside the SECA boundary 120, or this might be a spurious reading caused by a bad sample or transient condition.

127h—The system takes more frequent readings for a period, in order to confirm that the sample actually shows an uncompliant status, and is not based on spurious readings. The readings continue to be out of range, so the system logs this as a noncompliant situation.

127j—Since the ship is outside the SECA boundary 120, the system would be applying the higher range. The readings taken by the system are once again "good", indicating the ship is compliant with the standards applicable to this area.

127k—When the ship reaches its next port (off the map), all of the historical data accumulated since the last upload is transmitted from the onboard repository to the central server.

Alerts can be sent to a user on the ship with the emissions sampling apparatus 10 or an enforcement or government agency regarding compliance or non-compliance.

Mounting Options

Figures 8A, 8B, 8C, 8D, 8E, 8F:
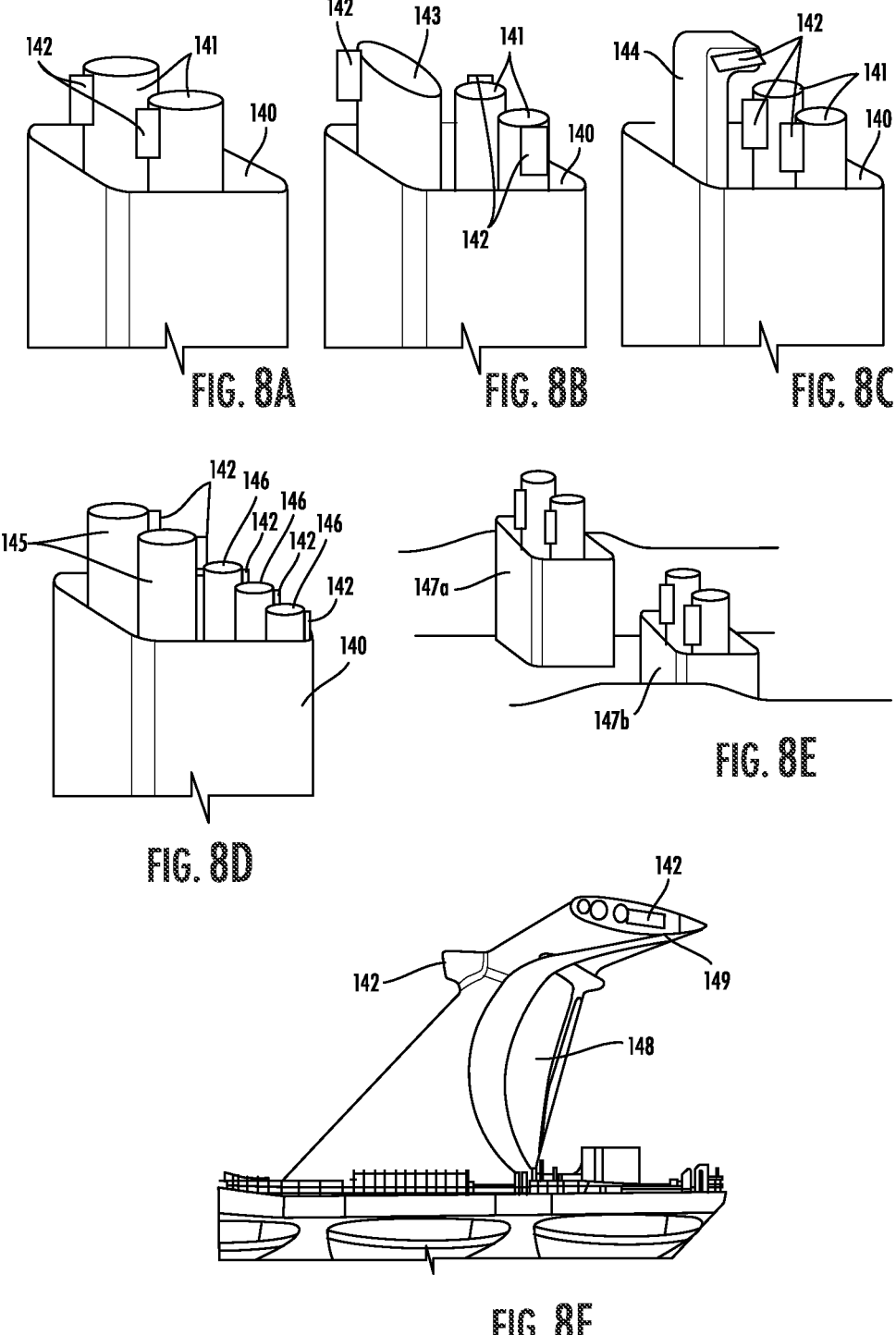
FIG. 8a shows a front mounting installation option on a pair of stacks of a single funnel.
FIG. 8b shows outboard side installation on multiple stacks of a single funnel.
FIG. 8c shows mounting options on a curved exhaust stack.
FIG. 8d shows a back mounting option on a plurality of stacks of a single funnel.
FIG. 8e shows multiple funnels in which multiple stacks have sensors units installed.
FIG. 8f shows a cruise ship funnel with multiple exhaust stacks and mounting of a sensor unit.

FIGS. 8a-8f show examples of installation options for the shipboard emissions sampling apparatus 10. In FIGS. 8a-8d and 8f, there is a single funnel 140 within which there are multiple exhaust stacks 141, 143, 144, 145, and 146. FIG. 8e shows multiple funnels 147a and 147b of the sort shown in FIG. 8a. In each figure, locations 142 for installing the emissions sampling apparatus 10 are indicated by boxes.

FIGS. 8a and 8e show a front mounting option, and FIG. 8d shows a back mounting option. FIG. 8b shows an outboard side installation.

FIG. 8c shows a ship which has a curved exhaust stack 144 in addition to two straight pipes 141. For curved pipes 144, a side mount 142 as shown would be preferred.

FIG. 8f shows a cruise ship funnel 148 of the design where multiple exhaust stacks 149 leave the funnel 148 horizontally at the ends of "wings".

Method of autonomous real-time sulfur dioxide and carbon dioxide monitoring

Figure 7:
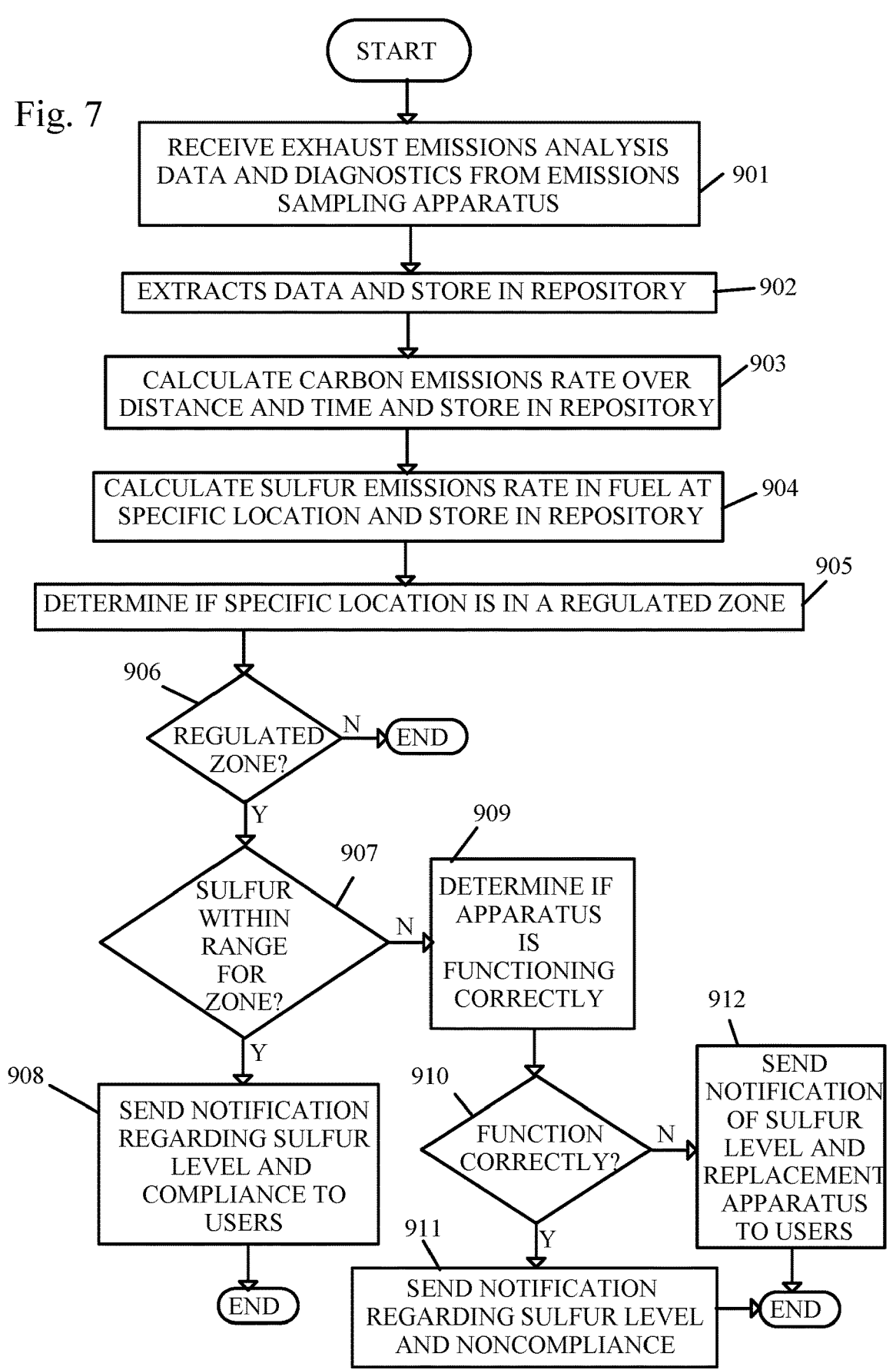
FIG. 7 shows a block diagram of a method of autonomous real-time sulfur dioxide and carbon dioxide monitoring of marine exhaust emissions.

FIG. 7 shows a method of autonomous real-time sulfur dioxide and carbon dioxide monitoring of marine exhaust emissions.

In a first step, the monitoring system of the monitoring center 30 receives exhaust emissions analysis data and diagnostics data of the maritime vessel (step 901). The data may be sent in a data array to the monitoring system.

The exhaust emissions analysis data can include: date, time, latitude and longitude, sulfur dioxide values, carbon dioxide values, gas humidity, gas pressure, altitude of the emissions sampling apparatus 10, speed of the maritime vessel, and heading of the maritime vessel, fuel type being used and other information associated with the exhaust of the maritime vessel.

The latitude and longitude data, date, time, altitude, heading and speed of the maritime vessel can be supplied the GPS system 16.

The sulfur dioxide values and the carbon dioxide values are preferably raw detector values from the detector 243 behind the passband filters 248.

The gas pressure and gas temperature are preferably taken within the sample chamber 244 of the gas absorption cell 240 with sensors 251.

The gas humidity is supplied by the relative humidity sensor 250. The sulfur dioxide sensor values and carbon dioxide sensor values can be calculated by the electronic drivers and processors 18 from the readings provided by the gas absorption cell 240. The gas pressure can also be provided by the gas pressure/temperature sensor 36.

The diagnostic data can include: enclosure temperature or thermal data from a temperature sensor within the emissions sampling apparatus, battery voltage, TEG voltage, geolocation, sample gas conditioning, filter pressure present in the prefilter or the layered filter, and tamper detection count.

The enclosure temperature is taken by the internal gas pressure/temperature sensor within the emissions sampling apparatus to determine anomalies in the data may be caused by the environmental conditions that put the emissions sampling apparatus out of the thermal operating tolerances of emissions sampling apparatus.

The battery voltage and TEG voltage are measured using internal analog-to-digital (ADC) converters to monitor thermal energy harvesting effectiveness and battery capacity and degradation.

The filter pressure is a measure of the difference in vacuum pressure in the gas path prior to vacuum pumping gas for the sample and immediately after pumping which can show trends of the filter clogging over time. Gas pressure sensors can be present in the exhaust 219 or the intake 207 of the layered filter 34. Additionally, pressure/temperature sensor 36 can be used.

The tamper count is indicative of whether the housing of the emissions sampling apparatus 10 has been removed or opened and is a tally of the number of times a light detector is exposed to light that indicates if the emissions sampling apparatus has been opened since manufacture, which would cast doubt on the values after an increase in the count. It is noted that if the tamper detection count is triggered, data is still collected but is flagged as possibly being defective.

It is noted that there is no connection to the ship data system for either data collection or transmission of the data to the monitoring center 30.

The data provided to the monitoring center 30 can be supplemented with additional ship data. For example, noon reports can be obtained to provide additional data for understanding fuel consumption and associated weather conditions the maritime vessel is in or was in during specific fuel consumption.

The diagnostic data is used to determine whether the emissions sampling apparatus 10 is functioning correctly, whether the emissions sampling apparatus 10 has been tampered with or whether the emissions sampling apparatus 10 should be replaced prior to device end-of-life.

The monitoring system of the monitoring center 30 extracts the data and stores the data in a repository (step 902).

The monitoring system then calculates the carbon emissions rate over distance and time and stores the carbon emission rate in the repository (step 903).

The monitoring system calculates the sulfur emissions rate in the fuel level at a specific location and stores the sulfur emission rate and the specific location of the maritime vessel in a repository (step 904).

The monitoring system determines if the specific location of the maritime vessel is in a regulated zone (step 905). The regulated zones are defined by a list of latitude and longitudinal coordinates that delineate the boundaries. For example, geofences can be used to determine if each sample is taken within or outside of any boundary.

If the specific location of the maritime vessel is in a regulated zone (step 906), and the sulfur emissions rate is within an expected range for the regulated zone (step 907), the monitoring system sends a notification regarding the sulfur emissions rate being within the expected range and fuel compliance of the maritime vessel to users (step 908) and the method ends. The calculation of the sulfur levels and their associated limits in specific locations is based on Regulation 14 of MARPOL Annex VI.

The users can be owners of the maritime vessel, captain of the maritime vessel or others present on the maritime vessel, Coast Guard, other law enforcement or users monitoring fuel consumption or environmental factors, other users.

If the specific location is in a regulated zone (step 906) and the sulfur emissions rate is not within an expected range for the regulated zone (step 907), the monitoring system determines if the emissions sampling apparatus 10 is functioning correctly (step 909). The function of the emissions sampling apparatus 10 can be determined by comparing the diagnostic data to a reference point within predetermined parameters. If the monitoring system determines that the emissions sampling apparatus 10 is not functioning correctly by functioning outside of the predetermined parameters or has been tampered with (step 910), a replacement emissions sampling apparatus 10 is sent to the maritime vessel and a notification is sent to the users with the calculated sulfur emissions rate (step 911) and the method ends. The tampering of the emissions sampling apparatus can be determined by the tamper count received.

If the specific location is in a regulated zone (step 906) and the sulfur emissions rate is not within an expected range for the regulated zone (step 907), the monitoring system determines if the sulfur dioxide emissions apparatus 10 is functioning correctly (step 909). If the monitoring system determines that the emissions sampling apparatus 10 is functioning correctly and within predetermined parameters and the tamper count has not exceeded a predetermined amount (step 910), a notification regarding the calculated sulfur emissions rate and noncompliance is sent to the users (step 912) and the method ends.

If the specific location is not in a regulated zone (step 906), the method ends.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

User Interface

Figure 12:
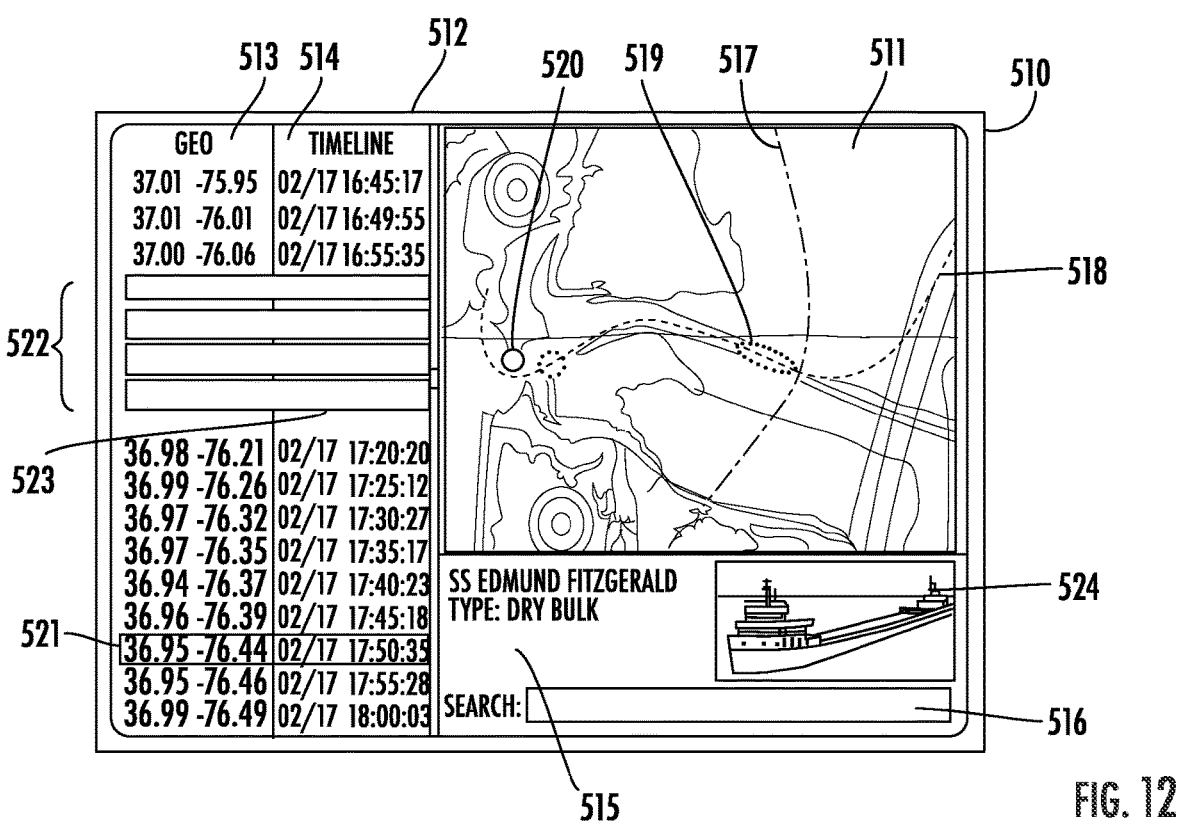
FIG. 12 shows an example user interface to convey ship data to a client.

FIG. 12 shows an example user interface to convey ship data to a client. The display may be implemented on any hardware desired, such as a tablet display 510 as shown in the figure. The example display in the figure is divided up into a time-data section 512, which has a column for geographic location (lat/lon) 513 and for time 514. A scroll bar 523 can be provided to give easy navigation through the table in a manner common to the art. An identification section 515 can be provided to display information about the identity of the vessel, which may include a picture 524 and other information, such as the "Type: Dry Bulk" note on the example display. A search box 516 may also be provided.

A map display 511 shows the path 118 of the vessel during the time interval shown on the time-data section 512. One of the time-data entries 521 is selected, and the location of the vessel on its path 518 at that time is shown by a circle 520 on the map.

The map also indicates the boundary of the SECA by a dash-dot line 517. Vessels inbound to the port are required to switch to a low-sulfur fuel before crossing the boundary of the SECA 517.

In this example, the vessel was late in switching fuels. During the time that the vessel was in the dotted portion 519 of the course line 518, it was still burning high-sulfur, which means the vessel was out of compliance during this period. The entries 522 on the time-data display 512 which correspond to this out-of-compliance period are highlighted to show the occurrence of the violation.

What is claimed is:

1. A method of autonomous sampling of an exhaust gas from at least one exhaust stack of a maritime vessel using an emission sampling apparatus comprising:

a computer receiving exhaust emissions data and diagnostic data from the emissions sampling apparatus and storing in a repository;

the computer calculating carbon emissions rate over distance and time;

the computer calculating sulfur emissions rate in fuel being burned by the maritime vessel at a specific location of the maritime vessel;

the computer determining if the specific location of the maritime vessel is in a regulated zone;

for each specific location of the maritime vessel in the regulated zone the computer determining whether the calculated sulfur emissions rate is within an accepted range;

for each specific location of the maritime vessel in the regulated zone in which the calculated sulfur emissions rate is within the accepted range, the computer sending a notification to users of fuel compliance at the specific location;

for each specific location of the maritime vessel in the regulated zone in which the calculated sulfur emissions rate is outside of the accepted range, the computer determining whether the emissions sampling apparatus is functioning within predetermined parameters and if the emissions sampling apparatus is functioning within the predetermined parameters, the computer sending a notification to users of the calculated sulfur emissions rate and noncompliance within the regulated zone to users;

wherein if the emissions sampling apparatus is functioning outside of the predetermined parameters, the computer sending a notification to users of the calculated sulfur emissions rate and a malfunction of the emissions sampling apparatus and sending a replacement emissions sampling apparatus to the maritime vessel.

2. The method of claim 1, wherein the exhaust emissions data comprises: date, time, latitude and longitude, sulfur dioxide sensor values, carbon dioxide sensor values, gas humidity of the exhaust gas, and exhaust gas pressure.

3. A method of autonomous sampling of an exhaust gas from at least one exhaust stack of a maritime vessel using an emission sampling apparatus comprising:

a computer receiving exhaust emissions data and diagnostic data from the emissions sampling apparatus and storing in a repository;

the computer calculating carbon emissions rate over distance and time;

the computer calculating sulfur emissions rate in fuel being burned by the maritime vessel at a specific location of the maritime vessel;

the computer determining if the specific location of the maritime vessel is in a regulated zone;

for each specific location of the maritime vessel in the regulated zone the computer determining whether the calculated sulfur emissions rate is within an accepted range;

for each specific location of the maritime vessel in the regulated zone in which the calculated sulfur emissions rate is within the accepted range, the computer sending a notification to users of fuel compliance at the specific location;

for each specific location of the maritime vessel in the regulated zone in which the calculated sulfur emissions rate is outside of the accepted range, the computer determining whether the emissions sampling apparatus is functioning within predetermined parameters and if the emissions sampling apparatus is functioning within the predetermined parameters, the computer sending a notification to users of the calculated sulfur emissions rate and noncompliance within the regulated zone to users, wherein the exhaust emissions data further comprises speed of the maritime vessel, hearing of the maritime vessel, and fuel type being used by the maritime vessel.

4. A method of autonomous sampling of an exhaust gas from at least one exhaust stack of a maritime vessel using an emission sampling apparatus comprising:

a computer receiving exhaust emissions data and diagnostic data from the emissions sampling apparatus and storing in a repository;

the computer calculating carbon emissions rate over distance and time;

the computer calculating sulfur emissions rate in fuel being burned by the maritime vessel at a specific location of the maritime vessel;

the computer determining if the specific location of the maritime vessel is in a regulated zone;

for each specific location of the maritime vessel in the regulated zone the computer determining whether the calculated sulfur emissions rate is within an accepted range;

for each specific location of the maritime vessel in the regulated zone in which the calculated sulfur emissions rate is within the accepted range, the computer sending a notification to users of fuel compliance at the specific location;

for each specific location of the maritime vessel in the regulated zone in which the calculated sulfur emissions rate is outside of the accepted range, the computer determining whether the emissions sampling apparatus is functioning within predetermined parameters and if the emissions sampling apparatus is functioning within the predetermined parameters, the computer sending a notification to users of the calculated sulfur emissions rate and noncompliance within the regulated zone to users, wherein the diagnostic data from the emissions sampling apparatus comprises temperature within a heat collector of the emissions sampling apparatus, battery voltage of the emissions sampling apparatus, thermo-electric generator voltage of the emissions sampling apparatus, geolocation of the emissions sampling apparatus, filter pressure present in a prefilter or a layered filter of the emissions sampling apparatus, and tamper detection count of the emissions sampling apparatus.

5. The method of claim 1, wherein the users are owners of the maritime vessel, law enforcement, environmental regulation agencies, or others present on the maritime vessel.

* * * * *